(No Model.) 2 Sheets—Sheet 2.
J. O. DONNER & J. V. V. BOORAEM.
BONE BLACK DRIER.
No. 263,874. Patented Sept. 5, 1882.
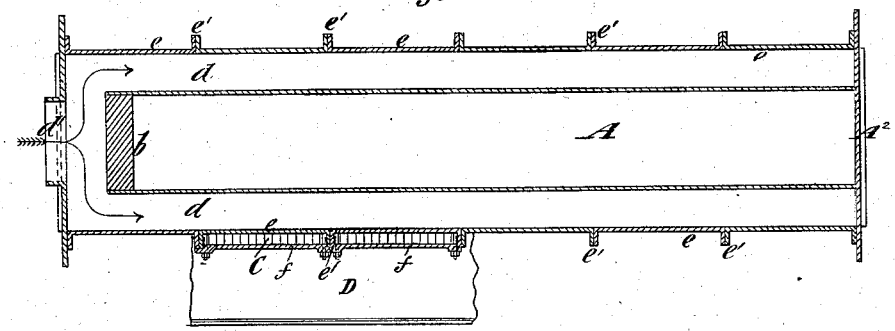
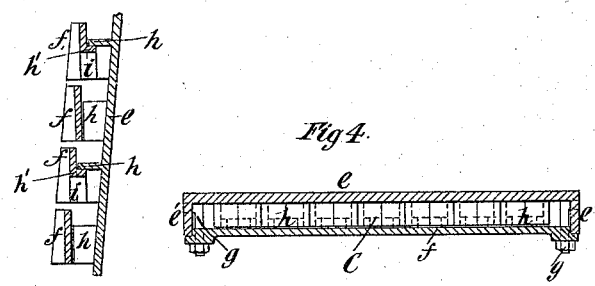
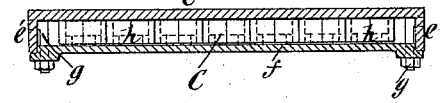

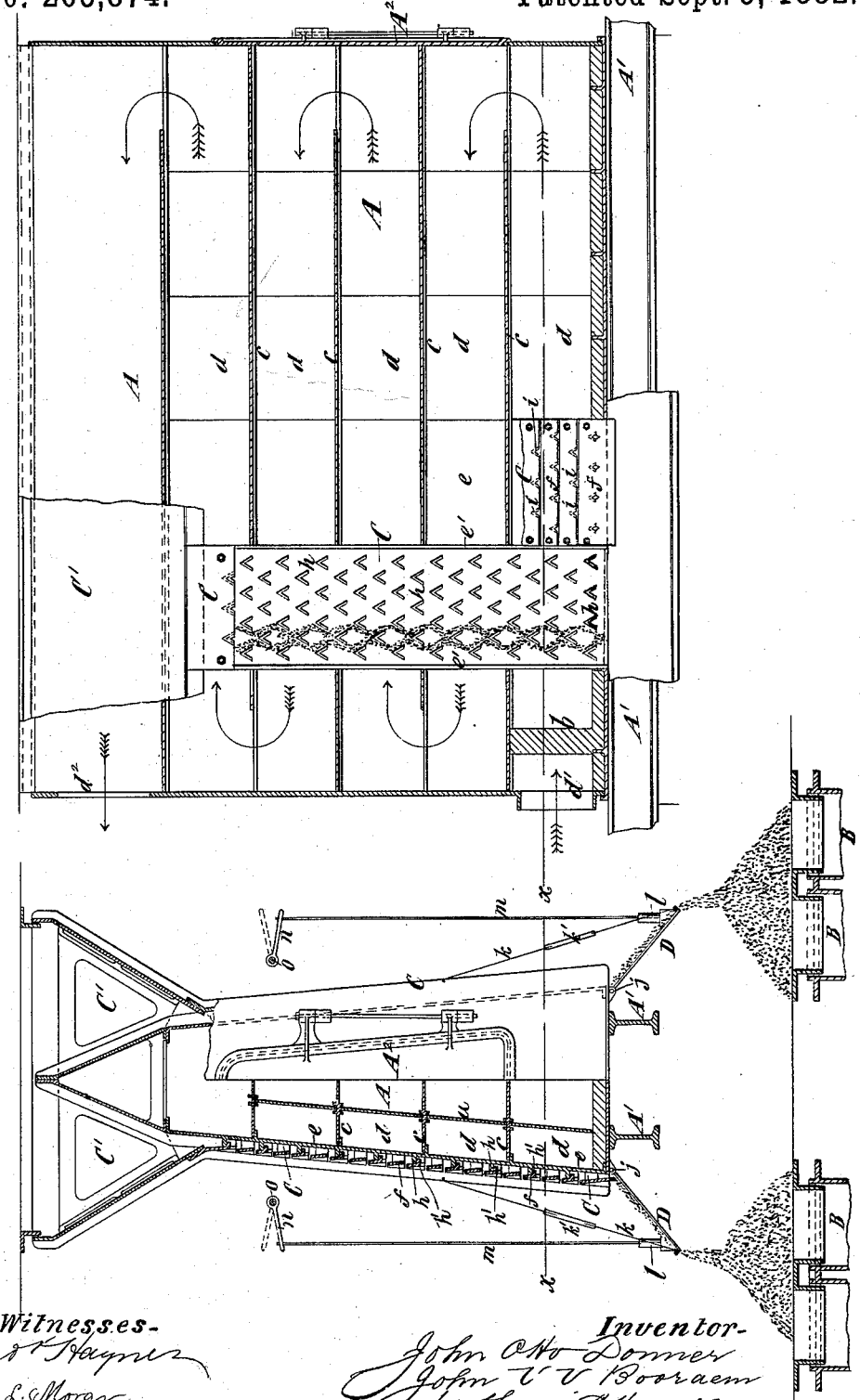

UNITED STATES PATENT OFFICE.

JOHN OTTO DONNER, OF NEW YORK, AND JOHN V. V. BOORAEM, OF BROOKLYN, N. Y.

BONE-BLACK DRIER.

SPECIFICATION forming part of Letters Patent No. 263,874, dated September 5, 1882.

Application filed March 13, 1882. (No model.)

*To all whom it may concern:*

Be it known that we, JOHN OTTO DONNER, of New York, in the county and State of New York, and JOHN V. V. BOORAEM, of Brooklyn, in the county of Kings and said State of New York, have invented certain new and useful Improvements in Bone-Black Driers, of which the following is a specification.

After bone-black, or "char," as it is commonly termed, has been used as a filtering material it must be dried and reburned or revivified before it can be again used.

The object of our invention is to provide a more effective and desirable apparatus in which the wet char may be thoroughly dried before it is delivered to the retorts or kilns for reburning.

To this end our invention consists in the combination, with a heating chamber or flue and a drying-chamber external thereto, provided with openings at the top and bottom, and through which the char may pass downward in contact with the heated wall between the heating-chamber and the drying-chamber, of deflectors composed of pairs of reversely-inclined planes extending between the inner and outer walls of the drying-chamber, and serving to deflect or direct the descending char alternately in opposite directions over the said heated wall. The pairs of reversely-inclined planes form inverted-V-shaped deflectors, which are very desirable, for the reason that the char which is in direct contact with the heated planes of one tier will be exposed to the air as it descends to the next tier, while the char which was before exposed to the air will be in direct contact with the heated inclined planes. By this means the char, as it descends through the drying-chamber, is alternately in direct contact with the heated inclined planes and exposed to the air, whereby the char is much more thoroughly and rapidly dried than it is where the passage down through the drying-chamber is unobstructed, so that one portion of the char is in direct contact with the heating-surface of the drying-chamber and another portion is exposed to the air throughout the entire height of the chamber.

The invention also consists in novel details of construction, including the making of the deflectors integral with the inner wall of the drying-chamber and the making of the outer wall of the drying-chamber of plates which are provided with inverted-V-shaped projections adapted to fit under the deflectors, and which cover and protect ventilating openings or notches in said plates and form guards to prevent the char from passing through these openings and becoming scattered, all as fully hereinafter described and claimed.

In the accompanying drawings, Figure 1 represents a vertical transverse section and partial end view of an apparatus embodying our invention. Fig. 2 represents a vertical longitudinal section thereof, including a partial side view of one drying-chamber and a second drying-chamber with its outer wall removed. Fig. 3 represents a horizontal section upon the dotted line $x\ x$, Fig. 1, of the heating-chamber and a portion of a drying-chamber. Fig. 4 represents a horizontal section of a drying-chamber upon a larger scale, to show more clearly its construction; and Fig. 5 represents a vertical section of a portion of a drying-chamber on the same scale as Fig. 4.

Similar letters of reference designate corresponding parts in all the figures.

A designates a heating-chamber, represented as supported upon beams A' over the retort B, for reburning the char. The heating-chamber A is divided by a partition-plate, $a$, near each side wall, which extends parallel with the wall, and the space between the two partition-plates $a$ may be closed at the end by a tile or wall, $b$, as shown in Fig. 3, so that the heating agent cannot enter into the space between them. The space between each plate $a$ and the adjacent wall of the heating-chamber is divided by horizontal partition-plates $c$, one above another, and these plates extend alternately from each end wall of the heating-chamber nearly to the opposite end wall, as clearly shown in Fig. 2, thus forming a circuitous flue, $d$, on each side of the heating-chamber, through which the heating agent passes back and forth from end to end of the heating-chamber. The flues $d$ communicate with an inlet-opening, $d'$, at the bottom of the chamber A on one end, and with an exit-opening, $d^2$, at the top of said chamber.

The heating agent required for heating the chamber A may be taken from any chimney, or from the escape-flue of the reburning-kilns, so that the drying may be effected without additional expense for fuel.

On each side of the heating-chamber, and external thereto, are formed a series of drying-chambers, C, which are supplied with wet char from the hopper C' at the upper ends thereof. These drying-chambers extend from the top to the bottom of the heating-chamber A, are open at the top and bottom, and their width is shown clearly in Fig. 2, though they may be of any desired width. The side walls, e, of the heating-chamber A form the inner walls of these drying-chambers, and the outer wall of each drying-chamber is represented as formed of a series of narrow plates, f. (Clearly shown in Fig. 2.) The inner walls, e, of the drying-chamber C are constructed in upright sections, as shown clearly in Figs. 3 and 4, and are provided at their edges with forwardly-projecting flanges e', forming the sides of the drying-chambers. The plates f lap over and bear upon the flanges e', as shown in Fig. 4, and are secured in place by bolts g, hooked into the flanges e' and passing through said plates. Thus it will be seen that each section of the inner wall, e, its flanges e', and front plates, f, form a separate drying-chamber, C, extending from top to bottom of the heating-chamber A and open at the top and bottom. The char enters the chambers C at the upper ends from the hoppers C', and in its passage downward in contact with the hot inner walls, e, of the chambers is dried, and then delivered at the lower ends thereof.

Extending between the inner walls, e, and outer walls, f, of the drying-chambers C are a series of projections or bridges, h, which are of inverted-V shape both on their upper and under sides, and in this example of our invention these bridges are cast upon the inner walls, e, of the drying-chambers C, as clearly shown in Figs. 4 and 5, and extend into close proximity to the outer walls, f. In order to complete them and prevent any space from being left between the ends of the bridges h and the outer walls, f, we cast the outer walls, f, with projections h', which are of the same inverted-V shape, and which fit under or below the projections or bridges, as shown in Figs. 4 and 5, thus forming bridges entirely across the chambers. Below the projections h' the front plates, f, are notched at i, thereby forming numerous ventilating-openings in the outer walls of the drying-chambers C. The bridges or projections h are arranged in horizontal tiers, as clearly shown in Fig. 2, and, as also shown in said figure, those in one tier are arranged directly opposite the spaces between those in the tier next above and below; and the function of these bridges or projections is a very important one in the operation of our apparatus. The top or upper surface of each bridge or projection h forms two planes inclined in opposite directions, as clearly shown in Fig. 2, and each bridge or projection constitutes a double deflector, as we will now describe, it being highly heated by being made integral with the inner wall, e, of the chamber. The wet char nearly fills the chamber C as it enters at their upper ends; but as it descends it is turned aside or deflected by the bridges h, and is by them divided into what may be considered streams or currents, which are more or less distinct from each other. This will be understood from Fig. 2, where we have endeavored to represent these streams or currents by dotting. It will be seen that each stream or current of char first strikes the inclined plane on one side of one bridge h and is thereby deflected to the right, then strikes the reversely-inclined plane of the bridges in the tier next below and is deflected to the left, then strikes the inclined plane of the bridge in the tier still lower and is deflected to the right, and so on to the bottom of the chamber C. This not only causes the char to take a zigzag line in descending, and thereby retains it for a longer time on the drying-chamber, but, what is of still more importance, it has an effect equivalent to turning the char over and over repeatedly. As each stream or current of char is deflected by the inclined plane of one bridge h, one side of the stream or current is in direct contact with the highly-heated surface of the bridge h, while the other side of the stream or current is exposed to the air, as it is adjacent to a hole or opening, i, in the outer wall, f; but as the stream or current is deflected by the bridge in the next lower tiers the side of the stream which was before exposed to the air is now in direct contact with the heated surface of the bridge, while the side which was before in direct contact with a heated surface is now exposed to the air, and the vapors generated by previous heating have a free opportunity for escape through the openings i, and are not retained in the char. Thus it will be understood that as the char descends from the top to the bottom of the chambers it is many times and alternately subjected to a high heat and to air for ventilating it, and it is obvious that such a method of treatment will effect a much more thorough and rapid drying than in apparatus where one side of the stream or current of char is continuously subjected to heat and the other side continuously exposed to the air.

The ventilating-openings i are also shown as of inverted-V shape, and as they are immediately below the projections h', of corresponding shape, they are protected thereby, and no char can escape through them.

Inasmuch as the char descends more readily as it becomes dried, the chambers C may be wider or of a greater dimension from the outer to the inner walls at the upper end than at the lower end.

In the end of the heating-chamber A is a door, A², which may be opened when it is desired to enter the chamber for cleaning or for any other purpose.

The dried char is delivered from the lower ends of the drying-chambers C in two heaps, from whence it may be admitted to the retorts B for reburning, and below the chambers, on each side, is an inclined delivery plate or chute, D, which is pivoted at $j$, adjacent to the outlets of the drying-chambers C. The delivery plates or chutes are suspended by rods or stays $k$, in which are turn-buckles $k'$, and by operating these turn-buckles to shorten the rods or stays the plates or chutes D will be drawn up and will close the open ends of the drying-chambers more or less. It will therefore be seen that the plates or chutes constitute valves for regulating the delivery of char from the drying-chambers C.

In order to facilitate the delivery of dried char from the inclined delivery plates or chutes D and prevent its clogging and accumulating thereon, we subject the said plates or chutes to a jarring or striking device, which may consist of a weight, $l$, suspended by a rod, $m$, which is raised by an arm, $n$, on a rock-shaft, $o$, and then let fall; but any other arrangement of devices might be used for a like purpose.

The inclined delivery board or chute acting as a valve, as above described, and operated on by jarring or striking devices, is equally applicable to other forms of drying apparatus.

The drying apparatus should be arranged at such height above the retorts, or above the floor or other place to which the char is delivered from the chutes D, that it will always have a free fall through the air for some distance below the chutes, and so have a free exposure to the air. This free exposure, while it is highly heated, will cause it to part with any moisture which remains in it after leaving the drying apparatus.

We are aware that a drier for char has been made in which a drying-chamber is arranged between two flues and the hot air passes from one flue to the other through pipes extending through the drying-chamber.

We are also aware that a grain-drier has been made in which a drying-chamber has a small air-flue at one end, with which it communicates by means of openings through which air may pass, the said drying-chamber being provided with deflectors to cause the grain to take a zigzag course in descending. We do not claim either of the above apparatus as included in our invention.

What we claim as our invention, and desire to secure by Letters Patent, is—

1. The combination, with a heating chamber or flue and a drying-chamber external thereto, provided with openings at the top and bottom, and through which the char may pass downward in contact with the heated wall between the heating-chamber and the drying-chamber, of deflectors $h$, extending between the inner and outer walls of the drying-chamber, and serving to deflect or direct the descending char alternately in opposite directions, substantially as and for the purpose herein described.

2. The combination, with a heating-chamber, of the external drying-chamber having the double deflectors $h$, formed integral with the inner wall, and having the front plates, $f$, provided with ventilating-openings $i$ below said deflectors, substantially as herein described.

3. The combination, with a heating-chamber and a drying-chamber, of the double deflectors $h$ and the corresponding projections, $h'$, on the outer wall of the drying-chamber, and fitting below the said deflectors, substantially as herein described.

4. The combination, with a heating-chamber, of the external drying-chamber having the double deflectors $h$, formed integral with its inner wall, and provided with the front plates, $f$, having the integral projections $h'$ and the ventilating-openings $i$, substantially as herein described.

JOHN OTTO DONNER.
JOHN V. V. BOORAEM.

Witnesses:
J. H. O'CONNELL,
JAMES WOOD.